(12) United States Patent
Hanada et al.

(10) Patent No.: US 6,555,230 B2
(45) Date of Patent: Apr. 29, 2003

(54) ARTIFICIAL LEATHER

(75) Inventors: Kazuyuki Hanada, Chuo-ku (JP); Akihiro Watanabe, Chuo-ku (JP); Kazuya Kimura, Chuo-ku (JP)

(73) Assignees: Dainichiseika Color & Chemicals Mfg. Co., Ltd., Tokyo (JP); Ukima Colour & Chemicals Mfg. Co., Ltd., Tokyo (JP)

( * ) Notice: Subject to any disclaimer, the term of this patent is extended or adjusted under 35 U.S.C. 154(b) by 115 days.

(21) Appl. No.: 09/813,208

(22) Filed: Mar. 21, 2001

(65) Prior Publication Data

US 2002/0041965 A1 Apr. 11, 2002

(30) Foreign Application Priority Data

Mar. 31, 2000 (JP) ........................................ 2000-097025

(51) Int. Cl.[7] ............................ B32B 27/00; B32B 27/40
(52) U.S. Cl. ..................... 428/423.1; 428/446; 428/447; 528/44; 528/70
(58) Field of Search ............................... 428/423.1, 446, 428/447; 528/25, 28, 44, 70, 219

(56) References Cited

U.S. PATENT DOCUMENTS

| | | |
|---|---|---|
| 4,240,943 A | 12/1980 | Sugawara et al. |
| 4,347,338 A | 8/1982 | Torii et al. |
| 4,746,684 A | 5/1988 | Kuriyama et al. |
| 4,853,418 A | 8/1989 | Hanada et al. |
| 4,942,212 A | 7/1990 | Hanada et al. |
| 5,945,185 A | 8/1999 | Hirai et al. |
| 6,117,489 A | 9/2000 | Ohkawa et al. |
| 6,384,174 B2 * | 5/2002 | Hanada et al. ......... 252/182.15 |

* cited by examiner

Primary Examiner—James J. Seidleck
Assistant Examiner—Travis B Ribar
(74) Attorney, Agent, or Firm—Oblon, Spivak, McClelland, Maier & Neustadt, P.C.

(57) ABSTRACT

Artificial leather has a base sheet and a resin layer arranged on at least one side of the base sheet. The resin layer comprises a polyurethane having side chains derived from a fluorine-containing diol represented by the following formula (I):

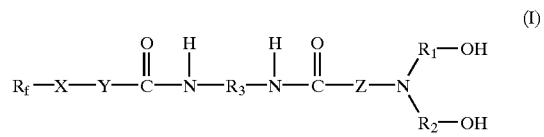

wherein $R_f$ represents a perfluoroalkyl or perfluoroalkenyl group having 1 to 20 carbon atoms; X represents a substituted or unsubstituted alkylene group having 1 to 10 carbon atoms, a substituted or unsubstituted alkenylene group represented by —CH=CH—$(CH_2)_n$— in which n stands for an integer of from 1 to 10, or

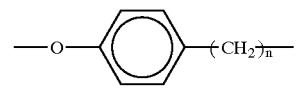

in which n stands for an integer of from 0 to 6; Y represents a direct bond, —O—, —NH—, or —$R_0$—NH— in which $R_0$ is an alkylene group having 1 to 6 carbon atoms; Z represents a direct bond or —N (R') R— in which R is an alkylene group having 1 to 20 carbon atoms and R' is a hydrogen atom or an alkyl group having 1 to 6 carbon atoms; $R_1$ and $R_2$ each independently represent a divalent organic group; and $R_3$ represents a residual group of an aliphatic, alicyclic or aromatic diisocyanate.

13 Claims, No Drawings

ARTIFICIAL LEATHER

BACKGROUND OF THE INVENTION a) Field of the Invention

This invention relates to artificial leather, and more specifically to artificial leather excellent in surface properties such as water repellency, oil resistance, abrasion resistance and non-tackiness in which a resin layer arranged on at least one side of a base sheet comprises a novel fluorine-containing polyurethane.

b) Description of the Related Art

Artificial Leather with a polyurethane layer arranged on at least one side of a base sheet such as a woven fabric or non-woven fabric has been used widely for many years. The polyurethane layer of such artificial leather is required to be excellent in stain resistance, waterproofness, abrasion resistance and non-tackiness, and depending on the application, is also required to be low in the coefficient of surface friction.

Polyurethane is obtained basically by reacting a palyol, a polyisocyanate and optionally, a chain extender, and depending on the kinds and combinations of these components, polyurethanes of various physical properties can be provided. It is to be noted that the term "polyurethane" as used herein collectively means polyurethane, polyurea and polyurethane-polyurea.

Processes have been proposed to copolymerize an organic fluorine compound with such polyurethane to impart properties of the organic fluorine compound, such as water repellency and oil repellency, non-tackiness, abrasion resistance and stain resistance, while retaining the inherent good properties of the polyurethane.

For example, polyurethanes each of which is obtained by copolymerizing a one-end diol having a perfluoroalkyl group are proposed in JP S43-26518 B, JP S61-252220 A, etc.

As a conventional process for the preparation of a one-end diol (the term "one-end diol" as used herein means "a compound having two hydroxyl groups at only one end of its molecule") having a perfluoroalkyl group (which, including a perfluoroalkenyl group, will hereinafter be abbreviated as "the $R_f$ group"), a process which proceeds following such a reaction scheme as will be described next is known.

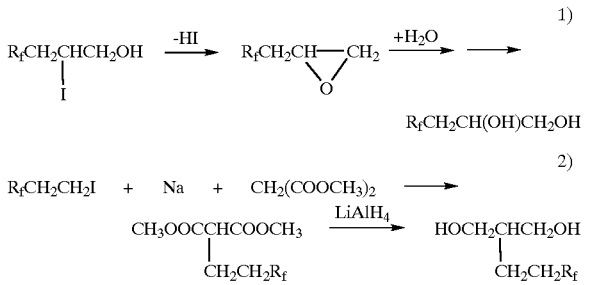

As is appreciated from the foregoing, the conventional processes for the preparation of one-end diols having the $R_f$ group all require many steps. High-purity products of the one-end diols having the $R_f$ group are hence costly, so that these conventional processes have a problem in their practical use on an industrial scale.

In polyurethanes each of which is available by copolymerizing a one-end diol having the $R_f$ group as in the conventional art, on the other hand, any attempt to make the polyurethanes exhibit functions of fluorine by increasing the contents of fluorine in the polyurethanes leads to reductions in certain inherent properties of the polyurethanes such as rubber elasticity and mechanical strength and accordingly, results in artificial leather of inferior flexibility, softness and strength. Such an attempt is therefore not preferred.

This is attributed to properties of the $R_f$ groups that the resulting polyurethane molecules are not easily bendable, are stiff and tend to orient in a particular direction, because fluorine atoms are very bulky and produce strong repulsion therebetween. As a result, a polyurethane is considered to be reduced in rubber elasticity due to inhibition to the freedom of the thermal motion of soft segments in the molecules and to be reduced in strength due to inhibition to aggregation of hard segments in the molecules. Namely, the above-described problem is considered to be caused for the reason that in a polyurethane, $R_f$ groups derived from the conventional $R_f$-containing one-end diol give strong effects on the polyurethane backbone due to short distances between the $R_f$ groups and the polyurethane backbone.

SUMMARY OF THE INVENTION

An object of the present invention is, therefore, to solve the above-described problems of the conventional art and hence, provide artificial leather composed of a polyurethane which is formed of an economical material and is excellent in water repellency and oil repellency, stain resistance, abrasion resistance, non-tackiness and the like.

The present inventors have proceeded with an extensive investigation to develop an economical process for the preparation of a one-end diol having an group, resulting in development of a novel preparation process. Further, the present inventors have also found that use of a fluorine-containing polyurethane, which employs the $R_f$-containing one-end diol available from the process, makes it possible to achieve the above-described object, leading to completion of the present invention.

The above-described object can be achieved by the present invention as will be described hereinafter.

In one aspect of the present invention, there is thus provided artificial leather having a base sheet and at least one resin layer arranged on at least one side of the base sheet, wherein the resin layer comprises a polyurethane having side chains derived from a fluorine-containing diol represented by the following formula (I):

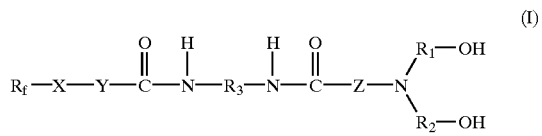

wherein $R_f$ represents a perfluoroalkyl or perfluoroalkenyl group having 1 to 20 carbon atoms; X represents a substituted or unsubstituted alkylene group having 1 to 10 carbon atoms, a substituted or unsubstituted alkenylene group represented by —CH=CH—$(CH_2)_n$— in which n stands for an integer of from 1 to 10, or

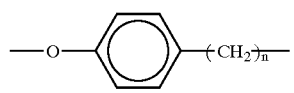

in which n stands for an integer of from 0 to 6; Y represents a direct bond, —O—, —NH—, or —$R_O$—NH— in which $R_0$ is an alkylene group having 1 to 6 carbon atoms; Z represents a direct bond or —N(R')R— in which R is an alkylene group having 1 to 20 carbon atoms and R' is a hydrogen atom or an alkyl group having 1 to 6 carbon atoms; $R_1$ and $R_2$ each independently represent a divalent organic group; and $R_3$ represents a residual group of an aliphatic, alicyclic or aromatic diisocyanate.

Owing to the formation of the resin layer, which is arranged on the base sheet, with the fluorine-containing polyurethane containing $R_f$s in its side chains, the artificial leather according to the present invention is provided with excellent surface properties—such as water repellency and oil repellency, stain resistance, abrasion resistance and non-tackiness—along with the superb rubber elasticity and strength properties inherent to the polyurethane and the fluorine compound, respectively.

DETAILED DESCRIPTION OF THE INVENTION AND PREFERRED EMBODIMENTS

The present invention will next be described in further detail based on certain preferred embodiments. The artificial leather according to the present invention is characterized in that the polymer layer arranged on at least one side of the base sheet comprises the polyurethane having side chains derived from the fluorine-containing diol represented by the formula (I), that is, the $R_f$-containing one-end diol.

The polyurethane for use in the present invention can be obtained by a conventional process for the production of polyurethanes, namely, by reacting the $R_f$-containing one-end diol represented by the formula (1), an active-hydrogen-containing compound and a diisocyanate, optionally in the presence of a chain extender. The $R_f$ groups in the polyurethane, said $R_f$ groups being stiff and having strong orientation, are located at ends of side chains and are spaced at least a predetermined distance from the backbone. Moreover, the $R_f$ groups are each bonded to the backbone of the polyurethane via a urethane bond or a urea bond, so that enhanced compatibility exists between the side chains and the polyurethane backbone and the freedom of motion of soft segments and the aggregation of hard segments in the polyurethane are not inhibited by the $R_f$ groups. Accordingly, the use of the fluorine-containing polyurethane has made it possible to provide the artificial leather with excellent surface properties—such as water repellency and oil repellency, stain resistance, abrasion resistance and non-tackiness—along with the superb rubber elasticity and strength properties inherent to the polyurethane and the fluorine compound, respectively.

The $R_f$-containing one-end diol, which is employed for the production of the polyurethane for use in the present invention, can be prepared by the following steps:

a) Firstly, a fluorine-containing diol (1) having an active-hydrogen-containing group (for example, a hydroxyl group) and a diisocyanate (2) are reacted at an NCO/OH ratio of approximately 2 to obtain a fluorine-containing compound (3) having one free isocyanate group in its molecule.

b) Using a difference in the reactivity to an isocyanate group between an amino group and a hydroxyl group, the fluorine-containing compound (3) and a dialkanolamine (4) are then reacted at a temperature not higher than 50° C. such that the isocyanate group and the amino group are selectively reacted to obtain an $R_f$-containing one-end diol represented by the following formula (A).

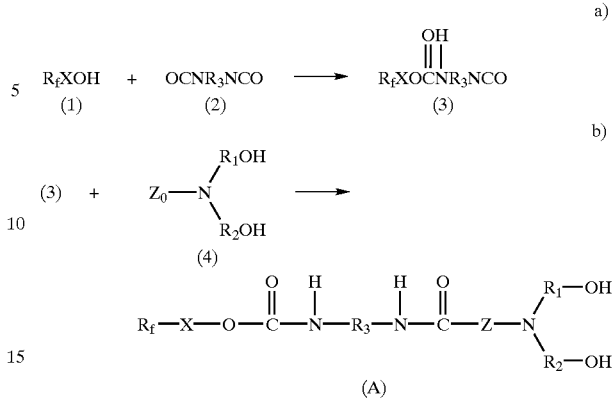

wherein $R_f$, $R_1$ to $R_3$, X and Z have the same meanings as defined above, and $Z_0$ represents H or an alkylamino group having 1 to 20 carbon atoms and a single primary or secondary amino group at an end thereof.

Examples of fluorine-containing compounds usable in the present invention can include the following compounds:

(1) Alcohol Type

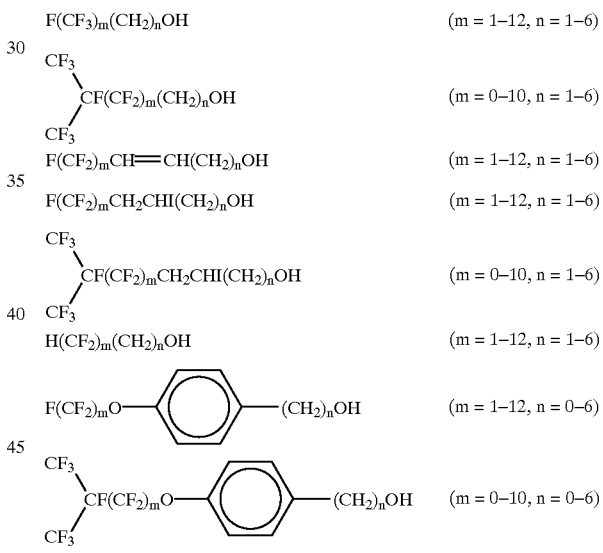

(2) Epoxy Type

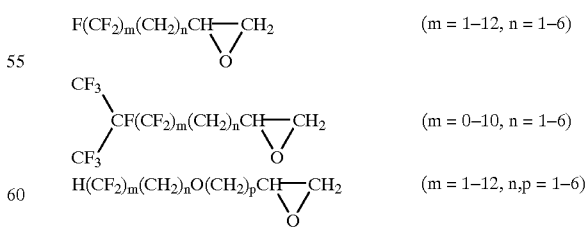

The above-described epoxy compounds are each used after introducing a terminal hydroxyl group therein by a reaction with an active-hydrogen-containing compound such as a polyol, a polyamide or a polycarboxylic acid.

(3) Amine Type

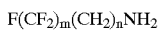  (m = 1–12, n = 1–6)

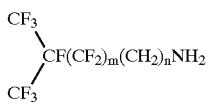  (m = 0–10, n = 1–6)

  (m = 1–12, n = 0–6)

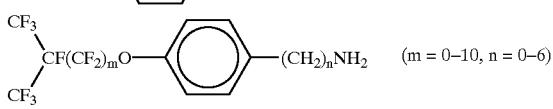  (m = 0–10, n = 0–6)

(4) Carboxylic Acid Type

  (m = 1–12, n = 0–6)

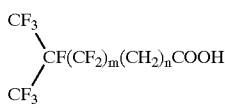  (m = 0–10, n = 0–6)

The above-listed fluorine-containing compounds, each of which has an active-hydrogen-containing group, are examples of compounds preferred for use in the present invention, and in the present invention, the fluorine-containing compound shall not be limited to these exemplified ones. In the present invention, it is therefore possible to use not only the above-exemplified fluorine-containing compounds but also known fluorine-containing compounds presently sold on the market and available from the market. Fluorine-containing compounds particularly preferred in the present invention are the above-exemplified fluorine-containing compounds of the alcohol type.

As the diisocyanate for use in the present invention, any diisocyanate known to date is usable, and no particular limitation is imposed thereon. Preferred usable examples can include aromatic diisocyanates such as toluene-2,4-diisocyanate, 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanatodiphenyl ether, 4,4'-methylenebis(phenyl-isocyanate) (MDI), durylene diisocyanate, tolidine diisocyanate, xylylene diisocyanate (XDI), 1,5-naphthalene diisocyanate, benzidine diisocyanate, o-nitrobenzidine diisocyanate, and 4,4-diisocyanatodibenzyl; aliphatic diisocyanates such as methylene diisocyanate, 1,4-tetramethylene diisocyanate, 1,6-hexamethylene diisocyanate, and 1,10-decamethylene diisocyanate; alicyclic diisocyanates such as 1,4-cyclohexylene diisocyanate, 4,4-methylene-bis(cyclohexylisocyanate), 1,5-tetrahydronaphthalene diisocyanate, isophorone diisocyanate, hydrogenated MDI, and hydrogenated XDI; and obviously, polyurethane prepolymers obtained by reacting these diisocyanates with polyols or polyamines of low molecular weights such that the resulting prepolymers have isocyanate groups at ends thereof.

Examples of dialkanolamines usable in the present invention can include compounds represented by the following formula:

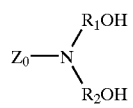

wherein $R_1$, $R_2$ and $Z_0$ have the same meanings as defined above, and preferably, $R_1$ and $R_2$ may each independently represent a divalent group having 2 to 12 carbon atoms and containing an aliphatic, alicyclic or aromatic ring, and the divalent group may contain one or more O, N and/or S atoms therein.

Preferred examples can include diethanolamine, dipropanolamine, dihexanolamine, 1-aminopropane glycol, diethanolaminomethylamine, diethanolaminoethylamine, and diethanolaminopropylamine.

A more specific description will now be made about the preparation process of the $R_f$-containing diol represented by the formula (I).

Firstly, the fluorine-containing compound, which has the active-hydrogen-containing group, and the diisocyanate are reacted at an equivalent ratio such that the reaction product contains one free isocyanate group in a molecule (NCO/OH≈2), in a solventless manner or in an organic solvent, in the presence or absence of a conventional polymerization catalyst for polyurethanes (for example, an organometal compound, a tertiary amine or the like), and at 0 to 150° C., preferably 20 to 90° C.

At a temperature of 50° C. or lower, preferably 40° C. or lower, more preferably 30° C. or lower, the above-described fluorine-containing compound having one free isocyanate group is then added dropwise into the above-described dialkanolamine.

Under these conditions, an isocyanate group selectively reacts with an amino group before a hydroxyl group [Ann. Chem., 562, 205 (1949)], whereby an $R_f$-containing one-end diol represented by the formula (I) according to the present invention is obtained and at low temperatures, a portion of the reaction product progressively precipitates as crystals in an organic solvent as the reaction proceeds. After completion of the reaction, the reaction mixture is poured into a poor solvent such as water, toluene, xylene or n-hexane to cause precipitation of the reaction product as crystals.

Unreacted diisocyanate and dialkanolamine can be eliminated by washing the precipitated crystals with a poor solvent (an aromatic or aliphatic hydrocarbon) at room temperature. The $R_f$-containing one-end diol represented by the formula (I) can, therefore, be obtained with high purity.

The fluorine-containing polyurethane for use in the present invention can be obtained by reacting the $R_f$-containing diol, which is represented by the formula (I) and has been obtained by the above-described reaction, with the above-described diisocyanate and also with the diol and/or diamine.

As the diol, diols which have been used to date for the production of polyurethane are all usable, and no limitation is imposed thereon. Illustrative are glycols of low molecular weight such as ethylene glycol, 1,2-propylene glycol, 1,3-propylene glycol, 1,4-butylene glycol, and 1,6-hexamethylene glycol; polyester diols obtained from dibasic acids, such as adipic acid, maleic acid and terephthalic acid, and glycols; polyester diols such as polylactones obtained by subjecting lactones to ring-opening polymerization with glycols; polycarbonate diols; and polyether diols such as polytetramethylene glycol, polyethylene glycol, and polypropylene glycol.

As the diamine, diamines which have been used to date for the production of polyurethane are all usable, and no particular limitation is imposed thereon. Illustrative are aliphatic diamines such as methylenediamine, ethylenediamine, trimethylenediamine, hexamethylenediamine, and octamethylenediamine; aromatic diamines such as phenylenediamine, 3,3'-dichloro-4,4'-diaminodiphenyl ether, 4,4'-methylenebis(phenyl)amine, 4,4'-diaminodiphenyl ether, and 4,4'-diaminodiphenylsulfone; and alicyclic diamines such as cyclopentadiamine and cyclohexyldiamine. Examples of the chain extender can include the above-described diols and diamines of low molecular weight. Chain extenders which have been used to date for the production of polyurethane are all usable, and no particular limitation is imposed thereon.

Using these components and a conventional process known for the production of polyurethane, the fluorine-contadining polyurethane according to the present invention can be obtained. The process according to the present invention for the production of polyurethane comprises reacting the, $R_f$-containing diol represented by the formula (I), the diisocyanate, the diol and/or diamine, and optionally, the chain extender. No particular limitation is imposed on the reaction conditions. Further, no particular limitation is imposed either on the reaction method, and the reaction can be performed by any method such as bulk polymerization, solution polymerization or dispersion polymerization. Moreover, a suitable combination of a diol, a diamine and a diisocyanate can be chosen depending on the application purpose and performance requirements of a target fluorine-containing polyurethane, and no particular limitation is imposed on them.

In the fluorine-containing polyurethane obtained by using the $R_f$-containing diol, the fluorine-containing side chains are bonded via $R_1$ and $R_2$ thereof to the backbone of the fluorine-containing polyurethane by means of urethane bonds (—NH—CO—O—) and/or urea bonds (NH—CO—NH—). Use of a diol provides a polyurethane, use of a diamine provides a polyurea, and combined use of a diol and an amine provides a polyurethane-polyurea.

The content of the fluorine-containing side chains in the polyurethane molecule may preferably range from 3 to 80 wt. % in terms of a fluorine content based on $R_f$ groups in the polyurethane molecule. A content lower than 3 wt. % leads to insufficient development of a function associated with surface energy based on the $R_f$ groups, while a content higher than 80 wt. % results in reductions in good properties inherent to polyurethane such as abrasion resistance and mechanical strength. Their contents outside the above-described range are, therefore, not preferred. Their content may preferably range from 5 to 50 wt. %, with a range of from 5 to 25 wt. % being more preferred.

As another embodiment of the present invention, the artificial leather is formed by using a fluorine-containing polyurethane which further contains polysiloxane segments, which have been derived from a polysiloxane having at least one active-hydrogen-containing group, in an amount such that the content of polysiloxane segments in the polyurethane molecule falls within a range of from 1 to 75 wt. %.

The polysiloxane for use in the present invention has at least one active-hydrogen-containing group, for example, at least one amino group, epoxy group, hydroxyl group, mercapto group, carboxyl group or like group. Preferred examples of such a polysiloxane can include the following compounds.

(1) Amino-modified Polysiloxanes

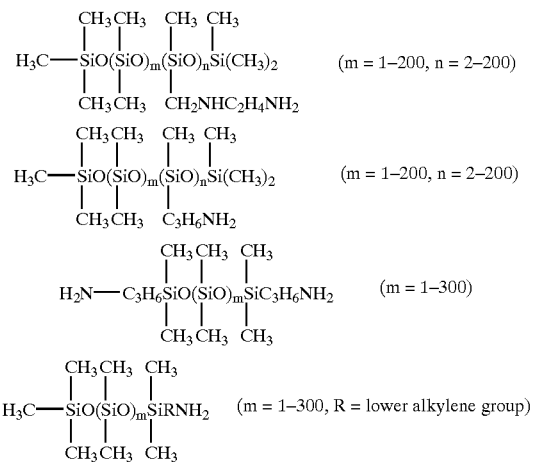

(2) Epoxy-modified Polysiloxanes

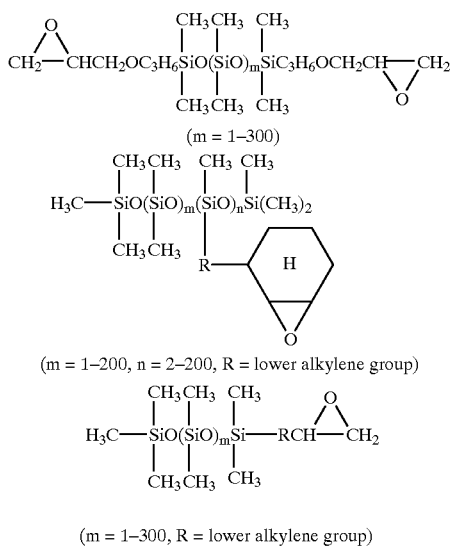

(3) Alcohol-modified Polysiloxanes

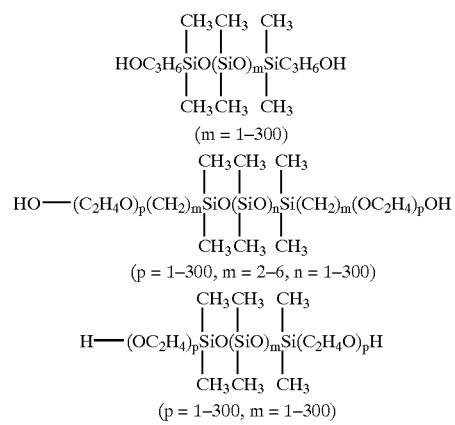

-continued

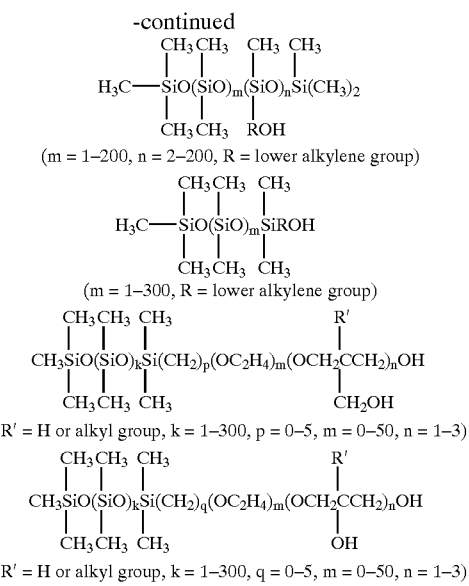

(m = 1–200, n = 2–200, R = lower alkylene group)

$$H_3C-SiO(SiO)_mSiROH$$
with $CH_3$, $CH_3$ groups (structure shown)

(m = 1–300, R = lower alkylene group)

$$CH_3SiO(SiO)_kSi(CH_2)_p(OC_2H_4)_m(OCH_2CCH_2)_nOH$$

(R' = H or alkyl group, k = 1–300, p = 0–5, m = 0–50, n = 1–3)

$$CH_3SiO(SiO)_kSi(CH_2)_q(OC_2H_4)_m(OCH_2CCH_2)_nOH$$

(R' = H or alkyl group, k = 1–300, q = 0–5, m = 0–50, n = 1–3)

(4) Mercapto-modified Polysiloxanes

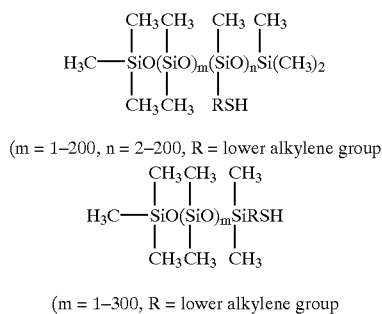

(m = 1–200, n = 2–200, R = lower alkylene group $$H_3C-SiO(SiO)_mSiRSH$$

(m = 1–300, R = lower alkylene group)

(5) Carboxyl-modified Siloxanes

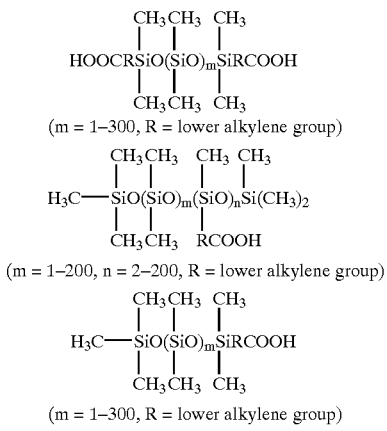

(m = 1–300, R = lower alkylene group)

$$H_3C-SiO(SiO)_m(SiO)_nSi(CH_3)_2$$ with RCOOH (m = 1–200, n = 2–200, R = lower alkylene group)

$$H_3C-SiO(SiO)_mSiRCOOH$$

(m = 1–300, R = lower alkylene group)

The above-listed polysiloxane, each of which has an active-hydrogen-containing group, are examples of compounds preferred for use in the present invention, and in the present invention, the siloxane shall not be limited to these exemplified compounds. Not only the above-exemplified polysiloxanes but also polysiloxanes presently sold on the market and readily available from the market are, therefore, all usable in the present invention. Polysiloxanes particularly preferred in the present invention are those containing at least one hydroxyl group or amino group.

The fluorine and silicon-containing polyurethane according to the present invention, which is available from the use of an $R_f$-containing one-end diol, a polysiloxane having at least one active-hydrogen-containing group in a molecule and the above-described another polyurethane component, is a polyurethane in which segments formed from a diisocyanate and segments formed from a diisocyanate are contained in the polyurethane backbone as in conventional polyurethanes, fluorine-containing side chains formed from a fluorine-containing diol presented by the formula (I) are bonded via $R_1$ and $R_2$ thereof to the backbone by means of urethane bonds and/or urea bonds, and polysiloxane segments formed from the polysiloxane are bonded to the backbone by means of urethane bonds and/or urea bonds.

The content of the polysiloxane segments in the polyurethane molecule may preferably be in such an amount that the siloxane content in the molecule ranges from 1 to 75 wt. %. A content lower than 1 wt. % leads to insufficient development of a function associated with surface energy based on the polysiloxane segments, while a content higher than 75 wt. % results in reductions in good properties inherent to polyurethane such as abrasion resistance and mechanical strength. Their contents outside the above-described range are, therefore, not preferred. Their content may preferably range from 3 to 50 wt. %, with a range of from 5 to 20 wt. % being more preferred.

For the production of such a fluorine-containing polyurethane of present invention as described above (the term "fluorine-containing polyurethane" as used herein will hereinafter mean to also embrace such compounds as containing polysiloxane segment(s)), the above-described polysiloxane can be used in the form of a solution in an organic solvent, a suspension in water, or pellets of 100 wt. % solid content.

The preferable fluorine content and polysiloxane segment content in the fluorine-containing polyurethane according to the present invention vary depending upon its application purpose, so that it is desired to obtain each fluorine-containing polyurethane with fluorine and polysiloxane segment contents suited for its application purpose.

The weight average molecular weight of the fluorine-containing polyurethane according to the present invention (as measured by GPC and calibrated against standard polystyrene) may range preferably from 5,000 to 500,000, more preferably from 30,000 to 150,000.

In the artificial leather according to the present invention, the resin layer formed of the above-described fluorine-containing polyurethane is formed on at least one side of the base sheet. No particular limitation is imposed on the base sheet, and base sheets which have been used for the production of artificial leather to date are all usable. Illustrative are woven various fabrics and non-woven fabrics, those obtained by impregnating such fabrics with resins, and those obtained by forming porous layers on their surfaces.

Upon producing the artificial leather according to the present invention, the resin layer made of the fluorine-containing polyurethane is formed on at least one side of the base sheet, and no particular limitation is imposed on the process for its formation. Preferred examples of the formation process can include: a process which comprises preparing a coating formulation by using, as an essential component, the fluorine-containing polyurethane useful in the present invention and adding various additives, such as conventionally-known coloring matters, plasticizers, surfactants, age resisters, crosslinking agents, as needed, coating the coating formulation onto a surface of the base sheet or impregnating the base sheet with the coating formulation, and then drying the thus-applied coating formulation to form the resin layer; a process which comprises coating the coating formulation onto a sheet of release paper, drying the coating formulation to form a film, and subsequent to peeling, bonding the film onto the base sheet; a process which comprises forming the fluorine-containing polyurethane into a film by calendering or a like method, and then bonding the film onto the base sheet. The fluorine-containing polyurethane layer may be of any thickness, but generally, has a thickness of from about 0.1 to 100 μm or so. The artificial leather according to the present invention can include one available by arranging a layer, such as a layer of a vinyl chloride resin with a plasticizer incorporated therein, and then forming the above-described fluorine-containing polyurethane layer as a stain-resistant layer over the vinyl chloride resin layer.

Artificial leather according to the present invention, which can be obtained as described above, has excellent stain resistance, waterproofness, abrasion resistance and non-tackiness, and therefore, can be used for the production of clothing, sportswear, furniture, wall paper, cars, shoes, sports shoes, gloves, tents, sheets, footwear, miscellaneous goods, and the like.

The present invention will hereinafter be described more specifically based on Referential Examples, Polymerization Examples, Examples and Comparative Examples. It should, however, be borne in mind that the present invention is not limited to or by these Examples. In the following Examples, all designations of "part" or "parts" and "%" are on weight basis unless otherwise specifically indicated.

REFERENTIAL EXAMPLE 1

Synthesis of Fluorine-containing Diol (I-A)

In a reaction vessel equipped with a stirrer, a thermometer, a nitrogen gas inlet tube and a reflux condenser and purged with nitrogen gas, toluene-2,4-diisocyanate (17.4 parts) was dissolved in ethyl acetate (50 parts). The resultant solution was heated to 60° C., at which under thorough stirring, powdery 2-(perfluorooctyl)ethanol (46.4 parts) was gradually added. After completion of the addition, the isophorone diisocyanate and 2-(perfluoro-octyl)ethanol were reacted at 80° C. for 3 hours, whereby a perfluoroalkyl-containing one-end isocyanate (A) was formed.

Diethanolamine (10.5 parts) was next mixed in ethyl acetate (10 parts) at temperatures not higher than 10° C. under stirring, and into the resulting solution, the reaction mixture with the compound (A) contained therein was added dropwise. With each dropwise addition of the reaction mixture with the compound (A) contained therein, occurrence of an exothermic reaction was observed. The dropwise addition was, therefore, effected such that the internal temperature did not exceed 20° C. As the reaction proceeded, the reaction mixture changed from a non-homogeneous solution into a homogeneous solution. Subsequent to completion of the dropwise addition, the reaction was allowed to continue for 2 hours at room temperature (25° C.)

After completion of the reaction, toluene was added to the reaction mixture to have the reaction product precipitated. The precipitate was collected by filtration, washed and then dried, whereby a fluorine-containing diol represented by the below-described formula (I-A) was obtained as white powder (yield: 95%, melting point: 145° C., hydroxyl number: 148).

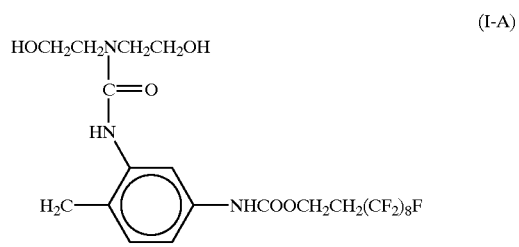

REFERENTIAL EXAMPLE 2

Synthesis of Fluorine-containing Diol (I-B)

A fluorine-containing diol having the below-described structural formula (I-B) was obtained as white powder in a similar manner as in Referential Example 1 except that in place of toluene-2,4-diisocyanate and 2-(perfluorooctyl) ethanol, isophorone diisocyanate and 2-(perfluoro-7-methyloctyl)-ethanol were used in the same equivalent amounts, respectively (yield: 95%, melting point: 132° C., hydroxyl number: 138).

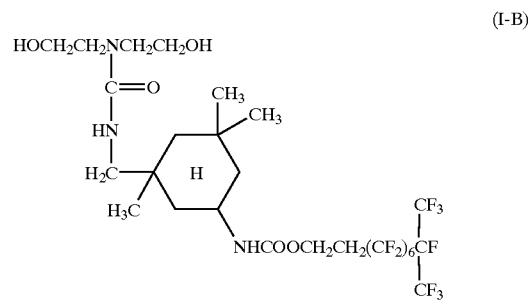

REFERENTIAL EXAMPLE 3

Synthesis of Fluorine-containing Diol (I-C)

A fluorine-containing diol having the below-described structural formula (I-C) was obtained as white powder in a similar manner as in Referential Example 2 except that in place of diethanolamine and 2-(perfluoro-7-methyloctyl) ethanol, diethanolaminopropylamine and 2-(perfluorodecyl) ethanol were used in the same equivalent amounts, respectively (yield: 95%, melting point: 153° C., hydroxyl number: 115).

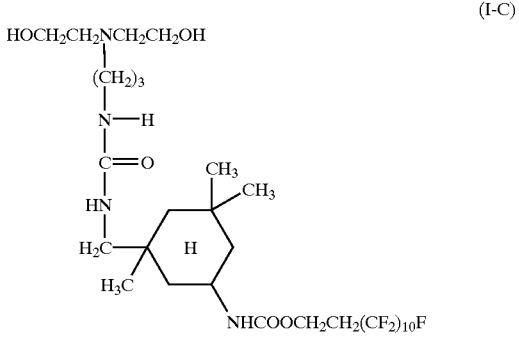

REFERENTIAL EXAMPLE 4

Synthesis of Fluorine-containing Diol (I-D)

A fluorine-containing diol having the below-described structural formula (I-D) was obtained as white powder in a similar manner as in Referential Example 2 except that in place of 2-(perfluoro-7-methyloctyl)ethanol, 2-(perfluorooctyl)-ethanol were used in the same equivalent amount (yield: 95%, melting point: 132° C., hydroxyl number: 138).

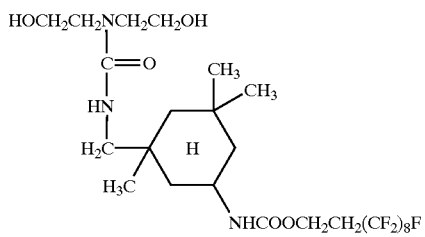

(I-D)

POLYMERIZATION EXAMPLES 1–3

Production of Polyurethanes

In each of the Examples, a reaction vessel equipped with a stirrer, a thermometer, a nitrogen gas inlet tube and a reflux condenser was purged with nitrogen gas, and into the reaction vessel, the corresponding fluorine-containing diol, the corresponding fluorine-free polymer diol and the fluorine-free diol, all of which are shown in Table 1-1, were added. Dimethylformamide was added in an amount such that a reaction mixture to be finally obtained would have a solid content of 35%, whereby a homogeneous solution was obtained. The diisocyanate shown in Table 1-1 was then added in a predetermined amount. A reaction was conducted at 80° C. until a predetermined solution viscosity was reached. Properties of three fluorine-containing polyurethanes obtained as described above are shown below in Table 1-1.

TABLE 1-1

|  | Polymerization Example 1 | Polymerization Example 2 | Polymerization Example 3 |
|---|---|---|---|
| Composition of PU raw materials |  |  |  |
| Fluorine-containing diol (i) | I-A | I-B | I-C |
| Polymer diol (ii) | POTMG(*1) | PCDO(*2) | PCLPO(*3) |
| Diol (iii) | 1,4-BG(*4) | 1,4-BG | 1,4-BG |
| i/ii/iii (weight ratio) | 2.5/12.5/1 | 6/15/1 | 12/10/1 |
| Diisocyanate | MDI(*5) | MDI | MDI |
| NCO/OH (molar ratio) | 1.02/1.00 | 1.02/1.00 | 1.02/1.00 |
| PU properties |  |  |  |
| Solution viscosity (35% concentration, dPa · s) | 240 | 320 | 200 |
| Weight average m.w. | 67,000 | 78,000 | 56,000 |
| Fluorine content (%) | 6 | 12 | 20 |
| Physical properties of PU |  |  |  |
| 100% modulus (20° C., MPa) | 3.6 | 6.6 | 7.1 |
| Breaking strength (20° C., MPa) | 52 | 56 | 49 |
| Breaking extension (20° C., %) | 560 | 545 | 480 |

Note
common to Table 1-1 to Table 2-2
*1 polyoxytetramethylene glycol, m.w.: 2000
*2 polycarbonatediol, m.w.: 2000
*3 polycaprolactonepolyol, m.w.: 2000
*4 1,4-butylene glycol
*5 4,4'-methylenebis (phenyl isocyanate)
PU: polyurethane

EXAMPLES 4–6

Production of Polyurethanes

In each of the Examples, a reaction vessel equipped with a stirrer, a thermometer, a nitrogen gas inlet tube and a reflux condenser was purged with nitrogen gas, and into the reaction vessel, the corresponding one of the above-described fluorine-containing diols (I-A, I-C, I-D), the corresponding one of the below-described polysiloxanes (II-A, II-B, IIC), the corresponding fluorine and polysiloxane-free polymer diol shown in Table 1-2 and the fluorine and polysiloxane-free diol of low molecular weight shown in Table 1-2 were added in the proportions shown in Table 1-2, respectively. Dimethyl-formamide was added in an amount such that a reaction mixture tobe finally obtainedwould have a solid content of 35%, whereby a homogeneous solution was obtained. The diisocyanate shown in Table 1-2 was then added in a predetermined equivalent amount. A reaction was conducted at 80° C. until a predetermined solution viscosity was reached. Properties of three fluorine and silicon-containing polyurethanes obtained as described above are shown below in Table 1-2.

$$\text{HOC}_2\text{H}_4\text{O}(\text{CH}_2)_3\overset{\overset{\text{CH}_3}{|}}{\underset{\underset{\text{CH}_3}{|}}{\text{Si}}}\text{O}(\overset{\overset{\text{CH}_3}{|}}{\underset{\underset{\text{CH}_3}{|}}{\text{Si}}}\text{O})_n\overset{\overset{\text{CH}_3}{|}}{\underset{\underset{\text{CH}_3}{|}}{\text{Si}}}(\text{CH}_2)_3\text{OC}_2\text{H}_4\text{OH}$$ (II-A)

(n: integer to give a molecular weight of 3,200)

$$\text{H}_2\text{NC}_3\text{H}_6\overset{\overset{\text{CH}_3}{|}}{\underset{\underset{\text{CH}_3}{|}}{\text{Si}}}\text{O}(\overset{\overset{\text{CH}_3}{|}}{\underset{\underset{\text{CH}_3}{|}}{\text{Si}}}\text{O})_m\overset{\overset{\text{CH}_3}{|}}{\underset{\underset{\text{CH}_3}{|}}{\text{Si}}}\text{C}_3\text{H}_6\text{NH}_2$$ (II-B)

(m: integer to give a molecular weight of 1,800)

$$\text{H}_3\text{C}-\overset{\overset{\text{CH}_3}{|}}{\underset{\underset{\text{CH}_3}{|}}{\text{Si}}}\text{O}(\overset{\overset{\text{CH}_3}{|}}{\underset{\underset{\text{CH}_3}{|}}{\text{Si}}}\text{O})_k\overset{\overset{\text{CH}_3}{|}}{\underset{\underset{\text{CH}_3}{|}}{\text{Si}}}(\text{CH}_2)_3\text{OCH}_2\text{CHCH}_2\text{OH}$$ (II-C)

(k: integer to give a molecular weight of 2,000)

TABLE 1-2

|  | Polymerization Example 4 | Polymerization Example 5 | Polymerization Example 6 |
|---|---|---|---|
| Composition of PU raw materials |  |  |  |
| Fluorine-containing diol (i) | I-D | I-A | I-C |
| Polysiloxane (ii) | II-A | II-B | II-C |
| Polymer diol (iii) | *1 | *2 | *3 |
| Diol (iv) | *4 | *4 | *4 |
| i/ii/iii/iv (wt. ratio) | 7/3/20/1 | 12/8/10/1 | 30/10/10/1 |
| Diisocyanate | *5 | *5 | *5 |
| NCO/OH (molar ratio) | 1.02/1.00 | 1.02/1.00 | 1.02/1.00 |
| PU properties |  |  |  |
| Solid content (%) | 35 | 35 | 35 |
| Solution viscosity (25° C., dPa · s) | 250 | 310 | 210 |
| Weight average m.w. | 68,000 | 72,000 | 57,000 |
| Fluorine content (%) | 7 | 13 | 19 |
| Siloxane content (%) | 8 | 18 | 14 |
| Physical properties of PU |  |  |  |
| 100% modulus (MPa) 20° C. | 4.2 | 5.9 | 7.2 |
| 0° C. | 8.1 | 11.5 | 15.6 |
| −20° C. | 17.3 | 19 | 25 |
| Breaking strength (MPa) 20° C. | 48 | 52 | 50 |
| Breaking extension (%) 20° C. | 510 | 500 | 520 |

COMPARATIVE POLYMERIZATION EXAMPLES 1–3

Production of Polyurethanes

Two fluorine-containing polyurethanes were produced in a similar manner as in Polymerization Examples 1–3 except that the below-described fluorine-containing compounds (I-A', I-B') were used, respectively (Comparative Polymerization Examples 1 and 2). In addition, a further polyurethane was produced without using any fluorine-containing diol (Comparative Polymerization Example 3). Properties of these polyurethanes are shown below in Table 2-1.

$$HOCH_2CH_2C_4F_8CH_2CH_2OH \quad (I\text{-}A')$$

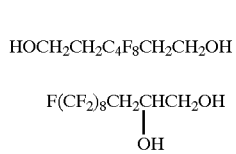

(I-B')

TABLE 2-1

|  | Comparative Polymerization Example 1 | Comparative Polymerization Example 2 | Comparative Polymerization Example 3 |
|---|---|---|---|
| Composition of PU raw materials |  |  |  |
| Fluorine-containing diol (i) | I-A' | I-B' | — |
| Polymer diol (ii) | *1 | *2 | *3 |
| Diol (iii) | *4 | *4 | *4 |
| i/ii/iii (weight ratio) | 3.3/6.7/1 | 3/7/1 | 0/15/1 |
| Diisocyanate | *5 | *5 | *5 |
| NCO/OH (molar ratio) | 1.02/1.00 | 1.02/1.00 | 1.02/1.00 |
| PU properties |  |  |  |
| Solution viscosity (35% concentration, dPa · s) | 300 | 280 | 350 |
| Weight average m.w. | 69,000 | 70,000 | 82,000 |
| Fluorine content (%) | 12 | 15 | 0 |
| Physical properties of PU |  |  |  |
| 100% modulus (20° C., MPa) | 19.4 | 18.1 | 5.6 |
| Breaking strength (20° C., MPa) | 76 | 56 | 57 |
| Breaking extension (20° C., %) | 360 | 285 | 400 |

COMPARATIVE POLYMERIZATION EXAMPLES 4–7

Production of Polyurethanes

Two fluorine-containing polyurethanes were produced in a similar manner as in Polymerization Examples 4–6 except that the above-described fluorine-containing compounds (I-A', I-B') were used, respectively (Comparative Polymerization Examples 4 and 5). In addition, a further polyurethane was produced without using any fluorine-containing diol (Comparative Polymerization Examples 6 and 7). Properties of these polyurethanes are shown below in Table 2-2.

In the above Examples and Comparative Examples, the fluorine content in each polyurethane was measured using an ion-exchange chromatographic analyzer (manufactured by Yokogawa Hokushin Denki K. K.), while its polysiloxane segment content was measured in terms of siloxane content in accordance with the infrared spectrophotometric analysis method set out in JIS K0117. Its solution viscosity was measured at 25° C. by using a Brookfield viscometer. By GPC, its weight average molecular weight was determined in terms of a weight average molecular weight calibrated against standard polystyrene. Further, its physical properties were measured in accordance with JIS K6301.

TABLE 2-2

|  |  | Comp. Ex. 4 | Comp. Ex. 5 | Comp. Ex. 6 | Comp. Ex. 7 |
|---|---|---|---|---|---|
| Composition of PU raw materials |  |  |  |  |  |
| F-containing diol (i) |  | I-A' | I-B' | — | — |
| Polysiloxane (ii) |  | — | II-A | II-C | — |
| Polymer diol (iii) |  | *1 | *2 | *3 | *3 |
| Diol (iv) |  | *4 | *4 | *4 | *4 |
| i/ii/iii/iv (weight ratio) |  | 3.3/0/6.7/1 | 7/3/20/1 | 0/3/12/1 | 0/0/15/1 |
| Diisocyanate |  | *5 | *5 | *5 | *5 |
| NCO/OH (molar ratio) |  | 1.02/1.00 | 1.02/1.00 | 1.02/1.00 | 1.02/1.00 |
| PU properties |  |  |  |  |  |
| Solid content (%) |  | 35 | 35 | 35 | 35 |
| Solution viscosity (20° C., dPa · s) |  | 300 | 290 | 210 | 350 |
| Weight average m.w. |  | 71,000 | 68,000 | 57,000 | 82,000 |
| Fluorine content (%) |  | 10 | 15 | 0 | 0 |
| Siloxane content (%) |  | 0 | 9 | 14 | 0 |
| Physical properties of PU |  |  |  |  |  |
| 100% modulus (MPa) | 20° C. | 19.4 | 17.5 | 3.5 | 5.6 |
|  | 0° C. | 36 | 27 | 5.7 | 6.8 |
|  | −20° C. | 49 | 45 | 9.3 | 14.2 |
| Breaking strength (MPa) | 20° C. | 76 | 51 | 15 | 57 |
| Breaking extension (%) | 20° C. | 360 | 450 | 450 | 400 |

EXAMPLES 1–6 AND COMPARATIVE EXAMPLES 1–7

Base sheets for artificial leather were prepared by coating woven fabrics with a solution of a polyurethane resin ("Leathamine UD-602S", trade name; product of Dainichiseika Color & Chemicals Mfg., Co., Ltd.) to give a dry coat thickness of 10 g/m² and then drying the thus-coated polyurethane resin solution intoadhesive layers, respectively. On the other hand, in each of Examples 1–6 and Comparative Examples 1–7, the corresponding one of the polyurethane solutions obtained in Polymerization Examples 1–6 and Comparative Polymerization Examples 1–7 was coated onto a sheet of release paper and then dried there whereby a film of about 15 μm in thickness was formed. The film was bonded to one of the base sheets so that artificial leather according to the present invention was obtained. Properties of the artificial leathers of Examples 1–6 and Comparative Examples 1–7 obtained as described above were determined, measured or ranked by the below-described methods. The determination, measurement or ranking results are presented in Table 3 and Table 4.

Testing Methods (1) Feeling: The touch of each artificial leather was determined by touching it with hand.

(2) Water repellency: The contact angle of a water droplet on the surface of each artificial leather was measured by a contact angle meter (manufactured by KYOWA INTERFACE SCIENCE CO., LTD.).

(3) Oil repellency: Following AATCC Method 118-1966, blend oils of class 0 to class 10 were successively dropped onto the surface of each artificial leather to visually determine whether or not the blend oils were repelled. When no repellence took place even with the blend oil of class 0, the oil repellency is rated the lowest and is indicated by "0". When repellence still took place even with the blend oil of class 10, the oil repellency is rated the highest and is indicated by "10".

(4) Abrasion test: Following JIS K-7311, each artificial leather was bonded to a paperboard, and on a Taber abrader, an H-22 abrasive wheel was driven 100 revolutions under a load of 1 kg. An abrasion wear (mg) was measured.

(5) Peel strength: An acrylic adhesive tape of 20 mm in width (product of Sekisui Chemical Co., Ltd.) was adhered under pressure onto the surface of each artificial leather by a rubber roller the own weight of which is 2 kg. One hour later, the peel strength (g/inch) was measured.

(6) Foldability: A specimen of each artificial leather was folded on itself over 180 degrees. When whitening occurred along the resultant crease, the foldability is considered to be poor. When the resultant crease remained unchanged in appearance, the foldability is considered to be good.

(7) Accelerated staining test: Onto a PVC leather produced by causing an expandable vinyl chloride resin composition, which contained 60 parts of a plasticizer (DOP) per 100 parts of vinyl chloride resin (polymerization degree, P=1050), to expand on a woven fabric, one of the polyurethane solutions prepared in Polymerization Examples 1–6 and Comparative Polymerization Examples 1–7, respectively, was coated by a gravure roll (150 mesh) to give a dry coat thickness of about 10 μm and was then dried to prepare artificial leather.

Specimens of each leather were left over in the below-described staining substance at 60° C. for 1 hour, and were then taken out of the staining substance. (i) One of the specimens was not wiped at a surface thereof (unwiped), (ii) another one of the specimens was wiped at a surface thereof with a dry cloth (dry wiped), and (iii) the remaining one of the specimens was wiped at a surface thereof with a wet cloth (wet wiped). The degree of stain on each specimen was visually ranked. The results will be indicated by the following ranking standard:

A: No stain is observed.

B: Stain is observed although it is extremely little.

C: Specimen is stained severely over the entire suface.

Staining Substance (Prepared by Grinding and Mixing the Following Components in a Ball Mill)

| | |
|---|---|
| Leaf mold | 38.0 parts |
| Cement | 17.0 parts |
| Kaolin | 17.0 parts |
| Silica gel | 17.0 parts |
| Carbon black | 1.75 parts |
| Ferric oxide | 0.50 part |
| Mineral oil | 8.75 parts |

(7) Felt-tipped marker ink and ballpoint pen ink smearing test: Alternately using red and black felt-tipped markers, lines were drawn on each specimen. With a cloth which had been fully soaked with xylene, the specimen was wiped five times in a direction perpendicular to the lines. The extent to which the felt-tipped marker inks had been wiped off was visually ranked. With respect to ballpoint pens, a similar test was also conducted using red and black ballpoint pens. The results will be indicated by the following ranking standard:

A: Inks have been completely wiped off, and no traces of wiped-off inks are observed at all.

B: Traces of wiped-off inks are observed although they are extremely little.

C: Inks remain without having been wiped-off.

TABLE 3

| | Feeling | Water repellency (degrees) | Oil repellency | Abrasion wear (mg) | Peel strength (g/inch) |
|---|---|---|---|---|---|
| Example 1 | Pliable | 108 | 8 | 90 | 34.3 |
| Example 2 | Pliable | 110 | 8 | 72 | 24 |
| Example 3 | Pliable | 112 | 8 | 55 | 19.6 |
| Example 4 | Pliable | 108 | 8 | 75 | 28 |
| Example 5 | Pliable | 110 | 8 | 42 | 15 |
| Example 6 | Pliable | 112 | 8 | 31 | 12 |
| Comp. Ex. 1 | Hard | 105 | 6 | 180 | 37.3 |
| Comp. Ex. 2 | Hard | 108 | 8 | 90 | 28 |
| Comp. Ex. 3 | Pliable | 73 | 0 | 310 | 29.5 |
| Comp. Ex. 4 | Hard | 105 | 6 | 180 | 37.3 |
| Comp. Ex. 5 | Hard | 108 | 8 | 90 | 3.5 |
| Comp. Ex. 6 | Pliable | 103 | 0 | 105 | 22 |
| Comp. Ex. 7 | Pliable | 73 | 0 | 310 | 295 |

TABLE 4

| | Foldability | Accelerated stain resistance | | | Stain resistance to felt-tipped marker ink | Stain resistance to ballpoint pen ink |
| | | Unwiped | Dry wiped | Wet wiped | | |
|---|---|---|---|---|---|---|
| Example 1 | Unchanged | B | A | A | A | A |
| Example 2 | Unchanged | A | A | A | A | A |
| Example 3 | Unchanged | A | A | A | A | A |
| Example 4 | Unchanged | B | A | A | A | A |
| Example 5 | Unchanged | A | A | A | A | A |
| Example 6 | Unchanged | A | A | A | A | A |
| Comp. Ex. 1 | Whitened | B | B | B | B | A |
| Comp. Ex. 2 | Whitened | A | A | A | A | A |
| Comp. Ex. 3 | Unchanged | C | C | C | C | C |
| Comp. Ex. 4 | Whitened | B | B | B | B | A |
| Comp. Ex. 5 | Whitened | B | A | A | A | A |
| Comp. Ex. 6 | Unchanged | C | C | C | C | C |
| Comp. Ex. 7 | Unchanged | C | C | C | C | C |

EXAMPLES 7–14

Fluorine-containing diols were obtained in a similar manner as in Referential Example 1 except that the below-described fluorine-containing alcohols 1–8 were used, respectively, in lieu of 2-(perfluorooctyl)ethanol. Using the thus-obtained fluorine-containing diols, the corresponding fluorine-containing (polysiloxane-containing) polyurethanes were also obtained in a similar manner as in Polymerization Examples 1 and 4. Employing the resultant fluorine-containing (polysiloxane-containing) polyurethanes, artificial leathers (Examples 7–14) according to the present invention excellent in various physical properties were obtained, respectively, in a similar manner as in Examples 1 and 4.

Used fluorine-containing alcohols

1.  $F(CF_2)_m(CH_2)_nOH$ (m = 6, n = 2)

2. 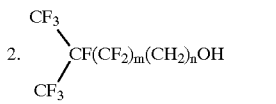 (m = 6, n = 2)

3.  $F(CF_2)_mCH=CH(CH_2)_nOH$ (m = 8, n = 2)

4.  $F(CF_2)_mCH_2CHI(CH_2)_nOH$ (m = 10, n = 2)

5. 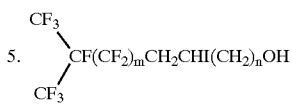 (m = 4, n = 2)

6.  $H(CF_2)_m(CH_2)_nOH$ (m = 8, n = 1)

7. 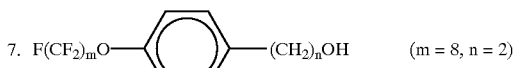 (m = 8, n = 2)

8. 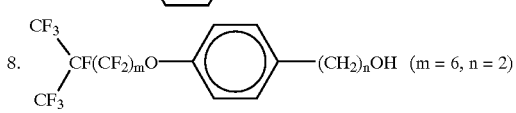 (m = 6, n = 2)

What is claimed is:

1. Artificial leather having a base sheet and at least one resin layer arranged on at least one side of said base sheet, wherein said resin layer comprises a polyurethane having side chains derived from a fluorine-containing diol represented by the following formula (I):

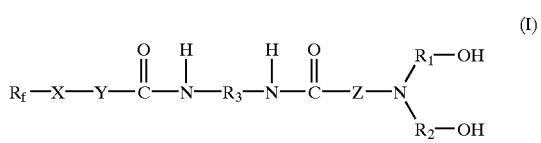

wherein $R_f$ represents a perfluoroalkyl or perfluoroalkenyl group having 1 to 20 carbon atoms; X represents a substituted or unsubstituted alkylene group having 1 to 10 carbon atoms, a substituted or unsubstituted alkenylene group represented by —CH=CH—(CH$_2$)$_n$— in which n stands for an integer of from 1 to 10, or

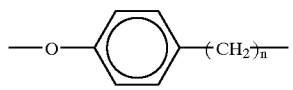

in which n stands for an integer of from 0 to 6; Y represents a direct bond, —O—, —NH—, or —R$_0$—NH— in which R$_0$ is an alkylene group having 1 to 6 carbon atoms; Z represents a direct bond or —N(R')R— in which R is an alkylene group having 1 to 20 carbon atoms and R' is a hydrogen atom or an alkyl group having 1 to 6 carbon atoms; R$_1$ and R$_2$ each independently represent a divalent organic group; and R$_3$ represents a residual group of an aliphatic, alicyclic or aromatic diisocyanate.

2. Artificial leather according to claim 1, wherein in said fluorine-containing diol represented by the formula (I), R$_1$ and R$_2$ each independently represent a methylene group having 2 to 4 carbon atoms, Y represents an oxygen atom, and each of said side chains is bonded via R$_1$ and R$_2$ thereof to a backbone of said polyurethane by means of a urethane bond.

3. Artificial leather according to claim 1, wherein said R$_f$—X—Y group in said formula (I) is a group derived by eliminating a hydrogen atom from a hydroxyl group of at least one of the following compounds:

 $F(CF_2)_m(CH_2)_nOH$ (m = 1–12, n = 1–6)

 (m = 0–10, n = 1–6)

 $F(CF_2)_mCH=CH(CH_2)_nOH$ (m = 1–12, n = 1–6)

 $F(CF_2)_mCH_2CHI(CH_2)_nOH$ (m = 1–12, n = 1–6)

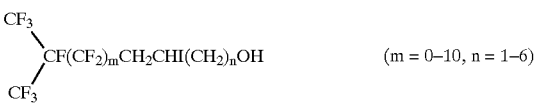 (m = 0–10, n = 1–6)

 $H(CF_2)_m(CH_2)_nOH$ (m = 1–12, n = 1–6)

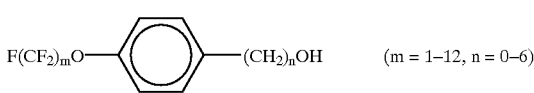 (m = 1–12, n = 0–6)

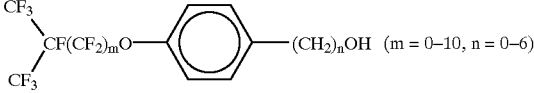 (m = 0–10, n = 0–6)

4. Artificial leather according to claim 1, wherein said Z—N(R$_1$OH)(R$_2$OH) group is a group derived by eliminating a hydrogen atom from an active-hydrogen-containing group bonded to Z$_0$, said active-hydrogen-containing group being represented by the following formula:

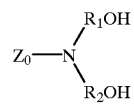

wherein R$_1$ and R$_2$ have the same meanings as defined above, and Z$_0$ represents H or an alkylamino group having 1 to 20 carbon atoms and a single primary or secondary amino group at an end thereof.

5. Artificial leather according to claim 1, wherein said polyurethane contains said side chains, which have been derived from said fluorine-containing diol represented by the formula (I), at a content such that said polyurethane has a fluorine content of from 3 to 80 wt. %.

6. Artificial leather according to claim 5, wherein said fluorine content ranges from 5 to 50 wt. %.

7. Artificial leather according to claim 6, wherein said fluorine content ranges from 5 to 25 wt. %.

8. Artificial leather according to claim 1, wherein said polyurethane further comprises 1 to 75 wt. % of polysiloxane segments derived from a polysiloxane having at least one active-hydrogen-containing group.

9. Artificial leather according to claim 8, wherein said active-hydrogen-containing group of said polysiloxane is a hydroxyl group or an amino group.

10. Artificial leather according to claim 8, wherein a content of said polysiloxane segments ranges from 3 to 50 wt. %.

11. Artificial leather according to claim 10, wherein said content of said polysiloxane segments ranges from 3 to 20 wt. %.

12. Artificial leather according to claim 1, wherein said polyurethane has a weight average molecular weight of from 50,000 to 500,000.

13. Artificial leather according to claim 12, wherein said weight average molecular weight ranges from 50,000 to 150,000.

* * * * *